E. ETTINGE.
MOLDING LAMP CHIMNEYS.
No. 50,105.    Patented Sept. 26, 1865.
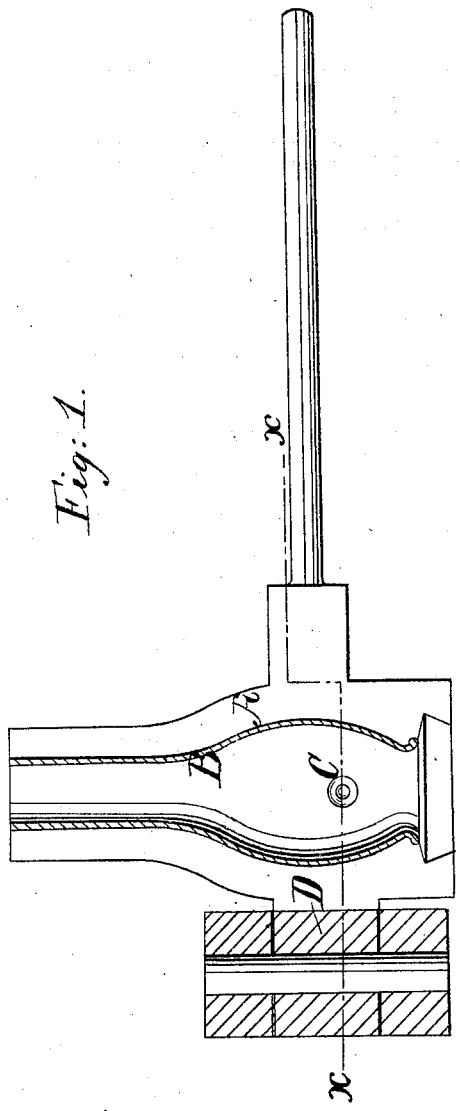
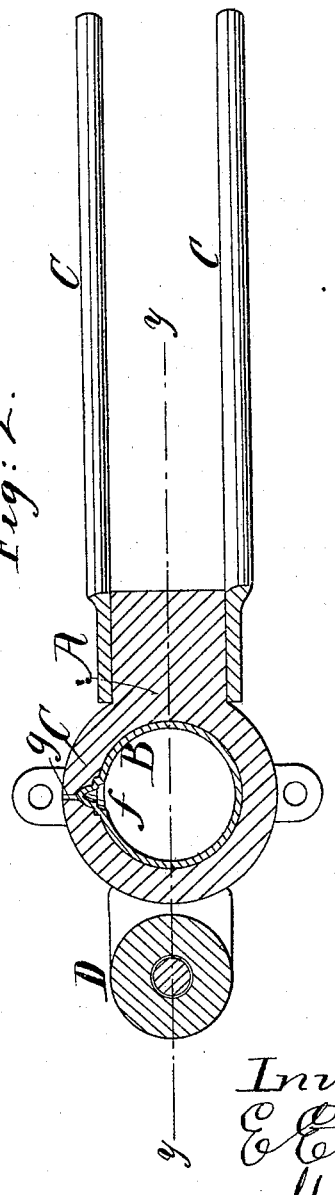
Witnesses:
Inventor:
E. Ettinge

UNITED STATES PATENT OFFICE.

EDGAR ELTINGE, OF KINGSTON, NEW YORK.

IMPROVEMENT IN MOLDING LAMP-CHIMNEYS.

Specification forming part of Letters Patent No. 50,105, dated September 26, 1865.

*To all whom it may concern:*

Be it known that I, EDGAR ELTINGE, of Kingston, in the county of Ulster and State of New York, have invented a new and useful Improvement in Molding Lamp-Chimneys; and I do hereby declare that the following is a full, clear, and exact description thereof, which will enable others skilled in the art to make and use the same, reference being had to the accompanying drawings, forming part of this specification, in which—

Figure 1 is a vertical section of a mold for making glass chimneys for lamps, the line $y$, Fig. 2, being the plane of section. Fig. 2 is a cross-section thereof, taken on the line $x$ of Fig. 1.

Similar letters of reference indicate like parts.

This invention relates to an improvement in the construction of molds for pressing glass lamp-chimneys; and it consists substantially in providing the mold with a depression in its side for the purpose of forming a lateral tube in the side of the chimney, opening therein at such a height as to permit easy access to the wick of the lamp with a match or taper.

A designates the mold. In Fig. 1 one-half thereof is seen, the lamp-chimney B formed in the mold being also represented.

D is the hinge which connects the halves of the mold to each other, and $e\,e$ are handles by which the mold is opened and closed.

C is the depression in one of the sides of the mold, in which the lateral tube $f$ of the chimney is formed. The depression is connected with an air-hole, $g$, made through the side of the mold, so that the end of the tube $f$ shall be left open in the process of molding. The place of the depression in the mold is determined by the height at which the tube $f$ is to be located in the chimney. The tube should be at such a height above the base of the chimney as to bring it above the top of the cone of the lamp—say of a coal-oil lamp—and about at the height of the wick, so that a match inserted through the tube $f$ may easily reach the wick.

By the use of this invention glass chimneys for lamps can be pressed or formed with an aperture or tube on their sides through which to light the lamps on which they may be used without being compelled to remove the chimney.

I claim as new and desire to secure by Letters Patent—

In molds for pressing glass chimneys for lamps, forming a depression on the side, in connection with an air-hole, for forming a tube in the sides of such chimneys, substantially as and for the purpose specified.

EDGAR ELTINGE.

Witnesses:
RICH. W. TAPPEN,
WM. MASTEN, Jr.